United States Patent [19]

Tyler

[11] 4,084,769
[45] Apr. 18, 1978

[54] PNEUMATIC DELIVERY SYSTEM

[75] Inventor: Tommy N. Tyler, 1110 Par Rd., Broomfield, Colo. 80020

[73] Assignee: Powers Regulator Company, Denver, Colo.

[21] Appl. No.: 749,376

[22] Filed: Dec. 10, 1976

[51] Int. Cl.² .............................................. B65G 51/30
[52] U.S. Cl. .......................................... 243/3; 243/20
[58] Field of Search ...................... 243/1, 3, 19, 20, 21, 243/23, 24, 32, 38, 39

[56] References Cited

U.S. PATENT DOCUMENTS

| | | | |
|---|---|---|---|
| 3,512,735 | 5/1970 | Hallstrom | 243/19 X |
| 3,556,437 | 1/1971 | Svedman et al. | 243/19 X |
| 3,761,039 | 9/1973 | Hazell | 243/19 |

*Primary Examiner*—John J. Love
*Assistant Examiner*—James L. Rowland

[57] ABSTRACT

A pneumatic transport system capable of transporting a delivery container around a sharp bend or corner without the need for conduit disposed on a large radius of curvature. A first conduit and a second conduit communicating with the first conduit are provided along with a blower system for creating a pressure differential in the conduits. The first conduit is designed to receive a delivery container, which is transported to a pneumatically movable capsule, disposed within the second conduit. A first port is provided in the capsule for causing the pressure differential to act on the capsule when the delivery container is placed therein to transport the capsule to a receiving station, and for causing the pressure differential to act on the delivery container at the receiving station for discharging the container from the capsule. A second port is provided for causing downstream pressure to pass to the atmosphere when the delivery container is not disposed within the capsule.

14 Claims, 4 Drawing Figures

U.S. Patent   April 18, 1978   4,084,769
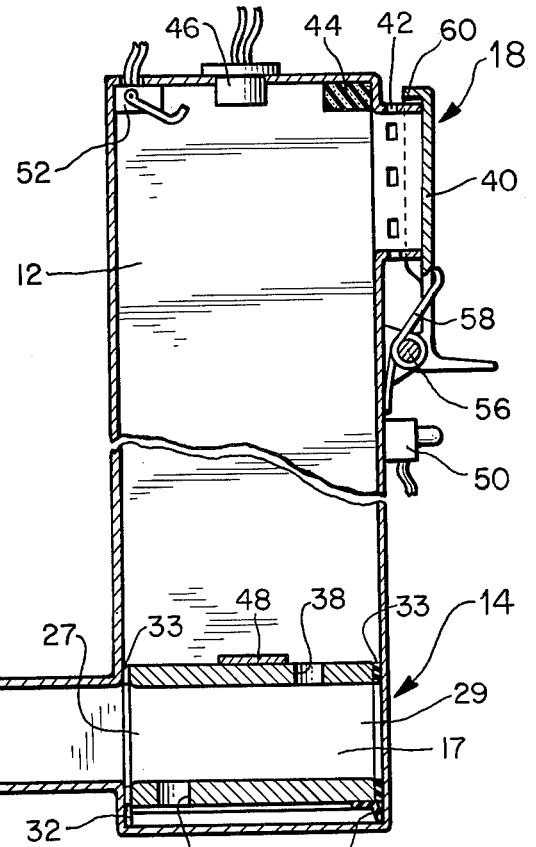
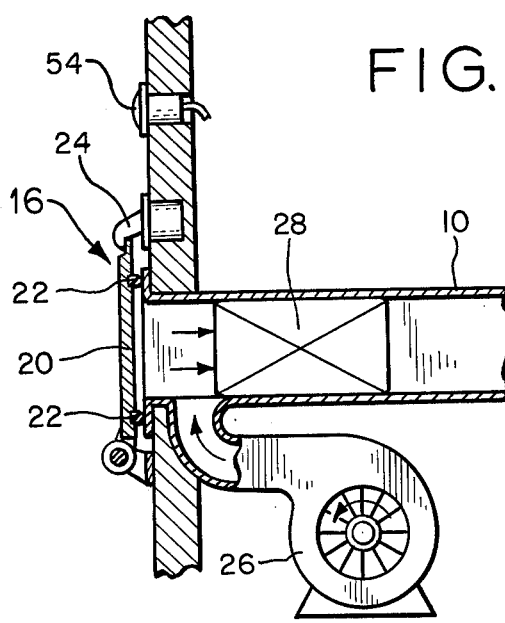
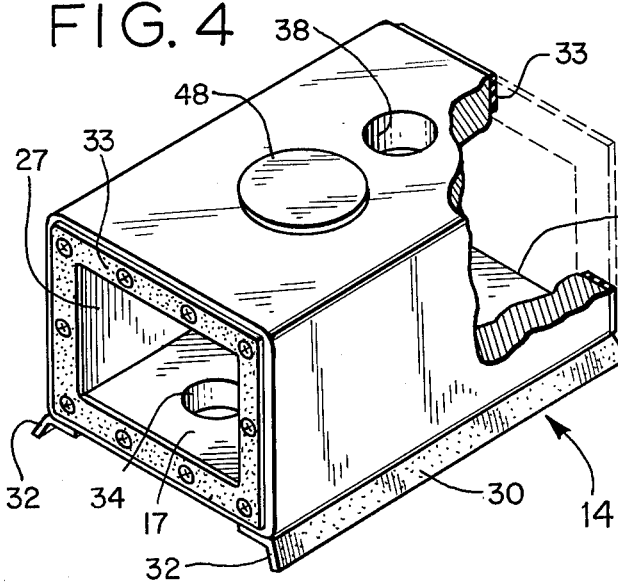

PNEUMATIC DELIVERY SYSTEM

BACKGROUND OF THE INVENTION

This invention relates to pneumatic delivery systems. More particularly, the invention relates to pneumatic delivery systems which require a container traveling in the system to traverse sharp bends or corners.

Pneumatic delivery systems include delivery conduits through which delivery containers travel from a dispatch point to a receiving point. The containers are moved through the delivery conduit by the action of pneumatic pressure which is usually provided by a blower and/or vacuum system.

In many applications it is desirable to dispose the delivery conduit in such a manner that it includes sharp bends. Such travel paths have been made possible by the development of the system disclosed in U.S. Pat. No. 3,761,039, issued to Hazell. In the Hazell system, a delivery container is pneumatically propelled through a first conduit to a capsule disposed within a second conduit. With the container in place the pneumatic pressure forces the capsule through the second conduit to a receiving station. This is all done without any moving valves.

The term "capsule" is used herein to denote a carrier different from that which contains the item to be transported. The term "delivery container" denotes the carrier which contains the transported item whether it be a document or the like or a physical object such as a retail sale item.

External piping is necessary in the Hazell system due to the reversibility feature of the system. However, not all systems require this feature. A genuine need has developed for a "one way" system which can be constructed less expensively than reversible systems such as those disclosed by Hazell.

It would be advantageous in some systems if the container were automatically propelled out of the capsule when the capsule reaches the receiving station. This would relieve the operator or customer of having to reach into the capsule to remove the container. Another need which has developed in this industry is the facilitation of automatic cushioning at points in the system where the container changes direction. This would not only increase the life of such systems and decrease maintenance, but would broaden the use of pneumatic systems into fields previously thought inapplicable due to characteristically turbulent passage through such systems.

SUMMARY OF THE INVENTION

According to this invention there is provided a pneumatic transport system including a first conduit, a second conduit communicating with the first conduit and means for creating a pressure differential in the conduits. A capsule is disposed within the second conduit for movement between the first conduit and a receiving station. The capsule includes chamber means for receiving a delivery container at the first conduit and first port means for cooperating with the delivery container to cause the pressure differential to act on the capsule when a delivery container is received therein from the first conduit and for causing the pressure differential to act on the delivery container at the receiving station for discharging the delivery container out of the capsule. Also included in the capsule is second port means for allowing downstream pressure to pass to the atmosphere when the delivery container is not disposed within the capsule.

BRIEF DESCRIPTION OF THE DRAWINGS

FIG. 1 is a cross sectional view of one embodiment of the invention with a delivery container in place, ready to be transported;

FIG. 2 is a partial cross sectional view with a delivery container disposed within the capsule at the bottom of the second conduit;

FIG. 3 is a partial cross sectional view with a delivery container at the receiving station, being discharged from the capsule; and FIG. 4 is a partial cross sectional view of the capsule.

DESCRIPTION OF THE PREFERRED EMBODIMENTS

In that form of the invention chosen for purposes of illustration in the drawings a first conduit 10 communicates with a second conduit 12, angularly displaced with respect thereto. A pneumatically movable capsule 14 is disposed in the second conduit 12. A dispatch station 16 and a receiving station 18 are situated at the extremities of the first and second conduits, respectively.

The conduits 10 and 12, and the capsule chamber 17 in the illustrated embodiment are designed to transport a delivery container having a rectangular cross section, but in the alternative the conduits, capsule chamber and delivery containers carried therein may be hexagonal or other cross section as desired for a particular use.

The dispatch station includes dispatch door 20 with an airtight seal 22 and suitable latching means 24. The means for providing a pressure differential is a blower 26 in the preferred embodiment, with its discharge positioned adjacent the end of the first conduit remote from the second conduit.

The first and second conduits themselves are of conventional construction, ordinarily of sheet metal soldered or welded at the seams. The conduits should be airtight to maintain the pressure differential in the system and minimize the required blower output.

The delivery container 28 used with the present invention may be of conventional design and may be either disposable or reusable. The cross sectional dimensions of the container should be only slightly smaller than the interior dimensions of the first conduit 10 and the capsule 14.

The pneumatically movable capsule 14 is positioned in the second conduit 12 to receive the delivery container 29 from the first conduit 10 and discharge the container at the receiving station 18. When the capsule 14 is in its initial position as shown in FIG. 1, the capsule receiving chamber 17 should be in alignment with the first conduit 10. Of course, the cross sectional dimensions of this chamber 17 and the first conduit 10 must correspond.

A suitable capsule for use in one form of this invention is shown in FIG. 4. The capsule 14 forms a receiving chamber 17 that is open on both ends. As used herein the term "entrance end" will refer to the left end 27 of chamber 17 as depicted in the FIGURES, or the end through which the delivery container 28 enters the chamber. The term "exit end" will refer to the right end 29 of chamber 17, or the end through which the delivery container leaves the capsule 14.

The capsule has a sealing lip 30 around its lower periphery designed to minimize air leakage past the capsule. This lip 30 is preferably resilient so that when air pressure is exerted thereagainst, the lip conforms itself to the inner lining of the conduit 12. That portion 32 of the lip which is adjacent the first conduit is of somewhat different configuration and does not extend outward from the capsule 14. This is to prevent the lip from catching on the first conduit edge as the capsule descends.

Chamber seals 33 may be provided around the periphery of each end of the capsule 14 to further minimize air leakage. The chamber seals 33 should be of a soft material, such as Velcro-type stripping conventionally used for various types of fasteners.

A first port 34 is adapted to provide communication between the interior chamber 17 of the capsule and the upstream portion of the second conduit 12. The first port is positioned such that it will not be covered by a delivery container properly disposed at rest within the chamber 17 of the capsule 14. Since the delivery container 28 is propelled from the first conduit 10 into the capsule, the delivery container will be adjacent the exit end 29 of the capsule chamber 17. Accordingly, the length of the delivery container 28 must be less than the distance from the exit end of the capsule chamber to the point at which the first port 34 is open to the interior chamber 17 of the capsule 14.

A second port 38 provides communication between the interior chamber 17 of the capsule 14 and the atmosphere when a delivery container is not disposed within the capsule. Thus, no pressure differential exists across the capsule, retaining the capsule in position at the lower end of the second conduit 12 until a delivery container is received by the capsule. In the illustrated embodiment the downstream end of the system, that portion ahead of a delivery container passing through the system, is open to the atmosphere at vent 42, which may be around the periphery of the receiving station door 40. This vent 42 maintains the downstream pressure in the system approximately equal to atmospheric or ambient pressure. Thus, when a delivery container is not disposed within the capsule 14, the pressure ahead of the container is allowed to pass through the second port 38 to the atmosphere via vent 42.

The second port is positioned such that it is covered by the delivery container 28 properly disposed within the capsule 14, adjacent the exit end 29. Since the first port 34 is not to be covered by the delivery container, the point at which the second port 38 is open to the interior of the capsule must be between interior opening of the first port 34 and the exit end 29 of the chamber 17. It is desirable that the second port 38 be positioned a short distance away from the exit end 29 rather than adjacent the conduit wall so that a cushioning area for the delivery container is provided in the capsule. Thus, when the container is propelled into the capsule from the first conduit, a small pocket of air is isolated to reduce the impacting force by compressing as the container seals off the second port 38 en route to coming to rest at the exit end 29 of the capsule chamber 17. With the delivery container disposed at the exit end of the chamber, the length of the container must be at least long enough to extend from the exit end to completely cover the second port. When the second port 38 is sealed off by the delivery container the first port causes pressure differential to be established across the top wall of capsule 14, propelling the capsule through the second conduit.

In the illustrated embodiment having a substantially vertical second conduit 12, the first port 34 is in the lower portion of the capsule, and is adapted to provide communication between the interior chamber 17 of the capsule 14 and upstream pressure below the capsule. The second port 38 is in the upper portion of the capsule, communicating the interior chamber 17 of the capsule to the downstream pressure above the capsule. The second port 38 allows upstream pressure within chamber 17 to leak off to the downstream side of the second conduit 12 above the capsule when a delivery container is not disposed therein. The second port 38 also insures cushioned descent from the top of the second conduit 12 after the delivery container 28 has been discharged at the receiving station 18. In the depicted embodiment the first and second ports are shown to be of similar size. This need not be true because the size of the ports will depend upon the weight of the capsule and the rate of air leakage past the sealing lip 30, factors which together with the size of ports 34 and 38 determine the rate of descent.

As the capsule 14 is propelled through the second conduit 12, downstream pressure above the capsule passes to the atmosphere so that the entire pressure differential will act upon the delivery container 28 to propel it out of the capsule 14. In the preferred embodiment this means comprises a pad 44 mounted on the end inner wall of the second conduit. This cuts off the flow of air through vent 42 when the capsule is positioned thereagainst. This pad 44 insures that the capsule is all the way to the end of the second conduit before the pressure acts on the delivery container 28.

An electromagnet 46 is desirably provided in the upper end of the second conduit to act as detent means for maintaining the capsule in its uppermost position while the delivery container 28 is being discharged therefrom. An armature plate 48 is mounted on the capsule 14 for maximum holding force. The electromagnet 46 is energized by switch 50 which is activated when the receiving door 40 begins to open. This switch 50 is also connected to blower 26 so to deenergize the blower when the door is opened.

A limit switch 52 may be provided which is connected to an indicator light 54 at the dispatch station 16. With the capsule at the receiving station the indicator light is lit so the operator knows a transaction is still in progress.

The hinge 56 of the receiving station door 40 is preferably located somewhat below the point at which the delivery container is discharged from the capsule. This is to insure that the bias provided by spring 58 does not make discharge from the capsule exceedingly difficult.

In the depicted embodiment a shoulder 60 is provided at the outer edge of the door to retain the delivery container after it is discharged from the capsule. The container may subsequently be removed by the recipient of the container. Alternate arrangements might include a roller (not shown) mounted at the edge of the door parallel to the door hinge 56. This would ordinarily ease removal of the container and might be preferable in some applications.

To operate the system the operator opens the dispatch station door 20, inserts a delivery container 28 in the first conduit 10 and closes and secures the door with latch 24. FIG. 1 depicts the system at this point with the delivery container in the vicinity of the dispatch station. The operator then energizes the blower 26, thus propelling the delivery container through the first conduit 10 into the capsule 14. The downstream pressure passes through second port 38 and out of the system through vent 42, thus maintaining the capsule 14 in position at the lower end of the second conduit 12. As the container passes second port 38 a cushioning air pocket at the exit end 29 of the capsule slows the travel of the container 28 to minimize the impact force against the wall of the second conduit 12.

With the delivery container in place in the exit end 29 of the capsule 14 as shown in FIG. 2, the second port 38 is blocked off. The capsule would be in this position for only an instant, before the pressurized air passes through first port 34 and elevates the capsule to the receiving station 18. As the capsule reaches this upper point, limit switch 52 is depressed, thus energizing the indicator light 54, showing the operator that a transaction is in progress. With the capsule in the uppermost position it abuts pad 44, thus blocking the flow of air out of vent 42. The pressure therefor acts on the delivery container 28 forcing same out the spring biased receiving door 40. As the door opens switch 50 energizes electromagnet 46 which holds the capsule in this uppermost position, and deenergized the blower 26. FIG. 3 depicts the system with the delivery container 28 partially discharged from the capsule 14.

With the delivery container fully removed, the receiving door swings shut, deenergizing magnet 46, thus causing the capsule 14 to drop. The descent is cushioned because the air below the capsule has to pass through the capsule ports 34 and 38. When the capsule drops, limit switch 52 and light 54 connected thereto indicate to the operator that that system is ready for another delivery.

Of course, it should be understood that various changes and modifications in the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. A pneumatic delivery system comprising:
   a first conduit;
   a second conduit communicating with said first conduit;
   means for creating a pressure differential in said conduits;
   a capsule disposed within said second conduit for movement between said first conduit and a receiving station, said capsule including chamber means for receiving a delivery container at said first conduit, first port means for cooperating with the delivery container to cause said pressure differential to act on said capsule when the delivery container is received therein from said first conduit for causing said pressure differential to act on the delivery container at the receiving station for discharging the delivery container out of said capsule, and second port means for allowing upstream pressure to pass to the atmosphere when the delivery container is not disposed within said capsule.

2. The pneumatic delivery system of claim 1 wherein said first port means communicates said pressure differential to the interior of said capsule and is positioned such that it is not covered by a delivery container disposed at rest within said capsule.

3. The pneumatic delivery system of claim 2 wherein said means for creating a pressure differential provides pneumatic pressure to said first conduit at a point adjacent a dispatch station so that when a delivery container is placed in said first conduit at the dispatch station, the delivery container is propelled through said first conduit into said capsule disposed within said second conduit, where said pneumatic pressure propels said capsule to the receiving station, at which point said pneumatic pressure acts on the delivery container for discharging the container out of said capsule.

4. In a pneumatic transport system having a substantially vertical conduit, means for creating a pressure differential in said conduit, a capsule disposed within said conduit for movement therethrough, and a receiving station on one side of the uppermost portion of said conduit, the improvement comprising:
   first port means communicating upstream pressure to the interior chamber of said capsule, said first port means positioned such that it is not covered by a delivery container disposed at rest within said capsule, so that after said pressure differential acts on said capsule to elevate said capsule to the uppermost portion of said conduit, at which point said pressure differential acts on the delivery container to discharge the container out of said capsule; and
   second port means communicating the interior chamber of the capsule to the atmosphere when a delivery container is not disposed within said capsule, so that no pressure differential exists across the capsule, thus retaining the capsule in position at the lower end of the conduit until a delivery container is received.

5. The pneumatic system of claim 4 wherein said second port means is in the upper portion of said capsule, positioned such that it is covered by a delivery container disposed at rest within said capsule so that after the delivery container is discharged out of said capsule, said capsule is allowed to descend in said conduit as the air in said conduit passes through said first and second port means.

6. The pneumatic system of claim 4 further comprising detent means for maintaining said capsule in its uppermost position while the delivery container is being discharged therefrom.

7. The pneumatic system of claim 4 further comprising sealing means for preventing air leakage between said conduit and the atmosphere as the delivery container is being discharged from said capsule.

8. A pneumatic transport system comprising:
   a conduit;
   means for creating pneumatic upstream pressure in said conduit; and
   a capsule disposed within said conduit for movement between a dispatch station and a receiving station, said capsule including chamber means for receiving a delivery container at the dispatch station, first port means for causing said upstream pressure to act on said capsule when the delivery container is placed therein at the dispatch station and for causing said pressure to act on the delivery container at the receiving station for discharging the delivery container from said capsule, and second port means for allowing pneumatic pressure to pass through said capsule when a delivery container is not disposed within said capsule, so that no pressure differential exists across said capsule when a delivery container is not disposed therein.

9. The system of claim 8 wherein said first port means communicates said pressure to the interior of said capsule, said first port means positioned such that it is not covered by a delivery container disposed within said capsule.

10. The system of claim 9 wherein said conduit is substantially vertical, and said second port means communicates the interior of said capsule to the downstream portion of said conduit, said second port means positioned such that it is covered by a delivery container disposed within said capsule, so that after the delivery container is discharged from said capsule, said capsule descends as the air in said conduit passes through said first and second port means.

11. The system of claim 9 further comprising detent means for maintaining said capsule at the receiving station while the delivery container is being discharged therefrom.

12. The system of claim 9 further comprising sealing means for preventing air leakage between said conduit and the atmosphere as said delivery container is being discharged from said capsule.

13. A pneumatic delivery system comprising:
a substantially vertical conduit having a receiving station at one side of the upper end;
means for creating a pneumatic pressure in said conduit; and
a capsule disposed within said conduit for movement therethrough, said capsule including first port means in its lower portion communicating the interior of said capsule to said pneumatic pressure below said capsule, said first port means positioned such that it is not covered by a delivery container disposed within said capsule, so that said pressure differential acts on said capsule to elevate said capsule to the upper end of said conduit, at which point said pressure differential acts on the delivery container to discharge the container from said capsule, said capsule also including second port means in its upper portion communicating the interior of said capsule to the portion of said conduit above said capsule, said second port means positioned such that it is covered by a delivery container disposed within said capsule, so that after the delivery container is discharged from said capsule, said capsule descends as the air in said conduit passes through said first and second port means.

14. A pneumatic delivery system comprising:
a first substantially horizontal conduit;
a second substantially vertical conduit communicating with said first conduit;
blower means for creating pneumatic pressure in said conduits adjacent the end of said first conduit remote from said second conduit; and
a capsule disposed within said second conduit for movement between said first conduit and a receiving station, said capsule including a chamber for receiving a delivery container at said first conduit, said chamber having entry and exit ends, first port means in the lower portion of said capsule communicating said chamber to said pneumatic pressure below said capsule, said first port means positioned such that it is not covered by a delivery container disposed within said capsule chamber adjacent the exit end of said capsule, said capsule also including second port means in its upper portion communicating said capsule chamber to the portion of said conduit above said capsule, said second port means positioned such that it is covered by a delivery container disposed within said capsule adjacent the exit end of said capsule, so that when a delivery container is placed into said first conduit at a point remote from said second conduit, the container is propelled to said capsule disposed within said second conduit, causing said pressure differential to elevate said capsule to the upper end of said second conduit, at which point said pressure differential acts on the delivery container to discharge the container from said capsule, thus allowing said capsule to descend in said second conduit as the air in said conduit passes through said first and second port means.

* * * * *